Aug. 13, 1940.  D. C. EIPPER  2,211,321
RETRACTABLE TOOL HOLDER
Filed March 24, 1938  2 Sheets-Sheet 1
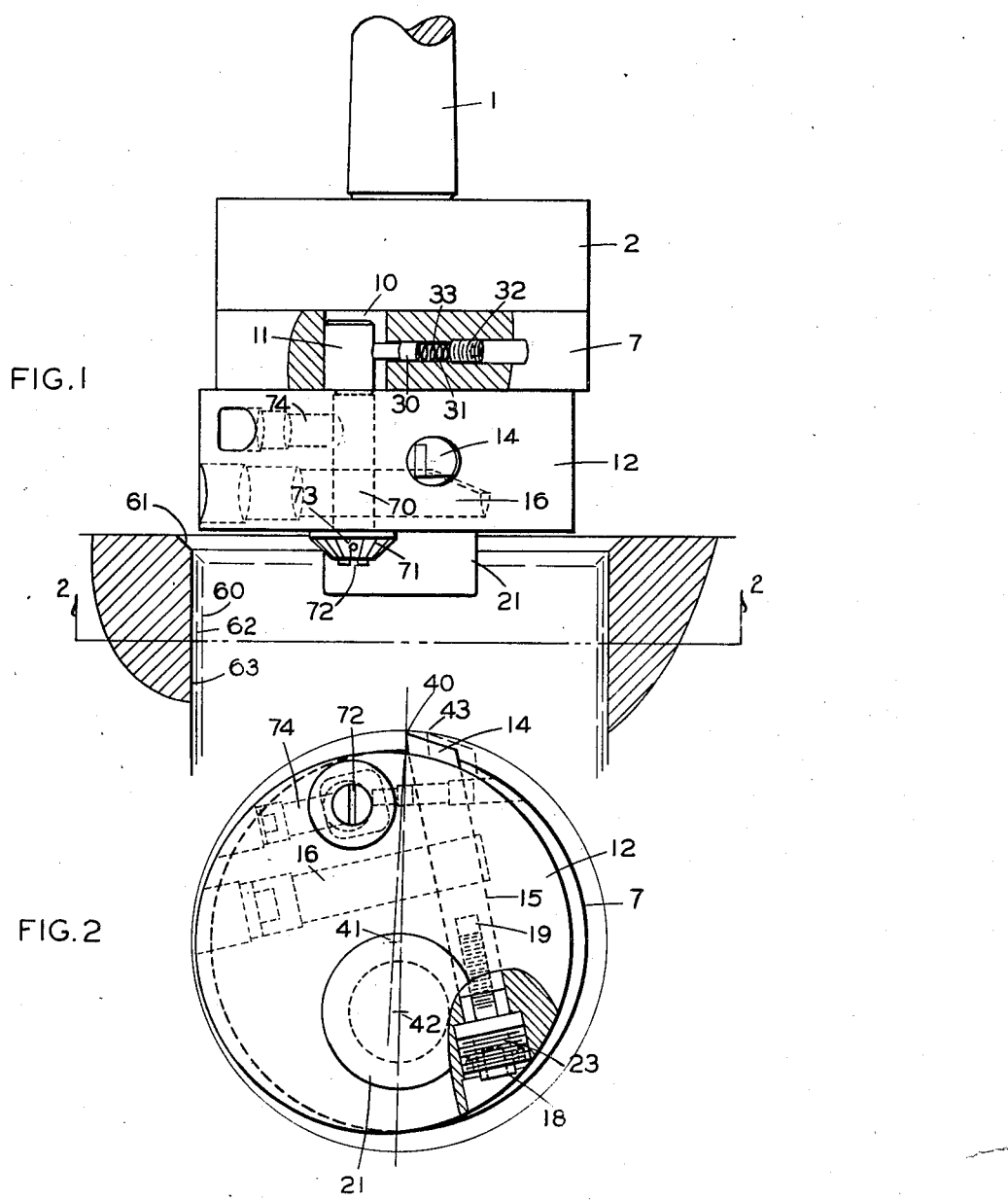
INVENTOR
Daniel C. Eipper
BY Bruno C. Lechler
ATTORNEY Aug. 13, 1940. D. C. EIPPER 2,211,321
RETRACTABLE TOOL HOLDER
Filed March 24, 1938 2 Sheets-Sheet 2
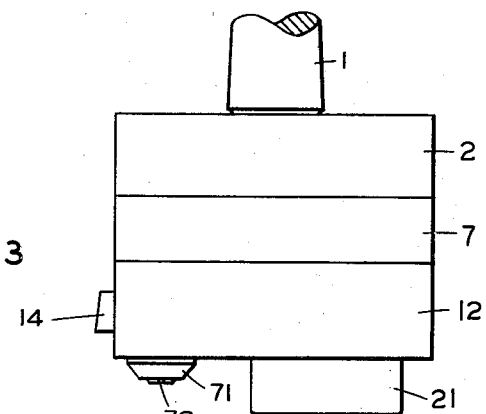
FIG. 3
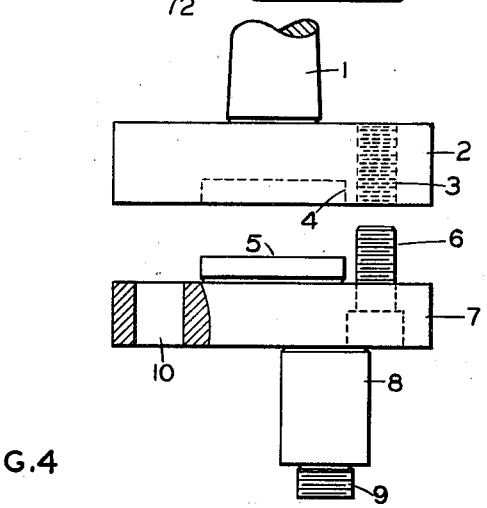
FIG. 4
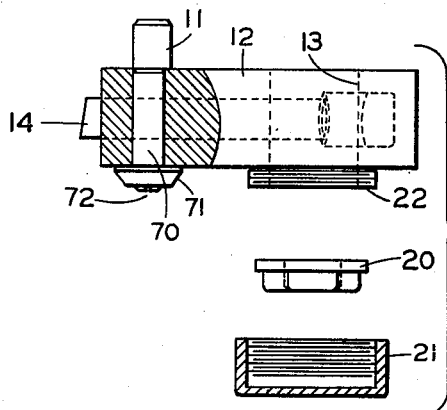
INVENTOR
Daniel C. Eipper
BY Bruno C. Lechler
ATTORNEY Patented Aug. 13, 1940

2,211,321

UNITED STATES PATENT OFFICE 2,211,321

RETRACTABLE TOOL HOLDER

Daniel C. Eipper, Moline, Ill., assignor to The Moline Tool Company, Moline, Ill., a corporation of Illinois Application March 24, 1938, Serial No. 197,770

6 Claims. (Cl. 77—58)

The present invention relates to a novel means for holding a tool in machining surfaces in general and incidentally in boring cylinders.

The object of the present invention is to support a tool in a manner that automatically lifts the tool from the finished surface on completion of a cut and automatically returns the tool to the finished surface level when taking a cut.

Another object is to provide a boring tool which may be set for a given bore and which will automatically contract to a smaller bore on completion of the cut permitting withdrawal while the boring spindle is running.

Another object is to support a tool clear of the finished surface and ahead of the seat against which the tool holder bears while cutting so that the cut will carry the tool back to cutting position with means automatically restoring the tool to the initial position on completion of the cut.

Another object is to provide a tool holder with micrometer adjustment for the cutting position which is not disturbed when the tool is automatically swung clear of the finished surface when the cut is completed.

Another object is to provide a tool head having several sections relatively movable permitting the final adjustment to be made by adjusting the relative approach of the sections without disturbing the tool holding clamps.

Another object is to support a boring tool on an off-center stud in a vertical boring head with limited horizontal movement between a cutting position and a contracted position with means tending to move the tool to the contracted position while the resistance of the cut carries the tool to cutting position.

Other objects will become apparent or suggest themselves upon an inspection of this specification and the drawings.

In surface generating machines such as a lathe, planer, or boring mill the tool takes a linear cut and a cross feed generates the surface by successive cuts. Cutting tools or finishing tools are either rigidly supported or the tool carrier is given motion enough to let the tool lift and drag in the return stroke. Such lifting may minimize marring the surface in the return stroke but not on the reversal of the cross feed. Thus the clapper box on a shaper will allow the tool to clear on the return stroke but will not prevent marring a finished surface if the cross feed is reversed while the shaper is running.

Conditions arise in machining certain shapes where the machine cannot be stopped and elevating the tool is also impractical lest the precise setting is lost.

I have found that the tool can be supported in a holder having limited motion with means lifting the tool above the surface less than the depth of the cut and that upon engaging the work, the pressure of the cut will carry the tool holder against a support and give a machined surface identical with that secured with a fixed tool yet disengaging itself upon completion of a cut and not marring the surface on reversing the cross feed.

Though I do not wish to limit myself to the specific application of this tool holder to boring holes I have illustrated its application to the boring of cylinders. An automatically contracting cutter is particularly advantageous here in that it permits withdrawal of the cutter while the boring spindle is running without marring the work. Hitherto the cutter had to be stopped and the work moved in the direction in which the cutter pointed to permit withdrawal of the spindle off center of the bore or else after stopping the spindle, the tool was moved manually into a retracted position in the boring bar during withdrawal of the spindle as shown in Patent 1,761,804. Complicated interlocks between table and spindle movements are often provided on production machines.

Figure 1 is an elevation of my invention applied to a boring tool shown about to enter a hole to be bored.

Figure 2, bottom view looking upward along line 2—2 in Figure 1, partly in section.

Figure 3 is a side view of the tool shown in Figure 1.

Figure 4 is an exploded view, partly in section, corresponding to Figure 3.

In the preferred form shown in the drawings 1 represents a shank fitting the spindle of the boring machine, the flange 2 having a number of tapped holes 3 and a cylindrical locating surface 4 concentric with the axis of the shank.

Stud piece 7 has countersunk holes for a number of screws 6, only one of which is shown. These screws enter tapped holes 3 in flange 2 and a plug 5 fitting locating surface 4 assures concentricity of the two pieces. A stud 8, shouldered and having a threaded end 9 parallel to the axis of the shank but off center is carried by piece 7. There is also a slot 10 in the stud piece 7 and a drilled hole 33, the end of which is tapped for a plug 32, this hole 33 running into hole 10.

A pin 30 in drilled hole 33 is urged away from plug 32 by a light spring 31.

The tool holder 12 has a bored hole 13 that permits mounting the tool holder on stud 8, a nut 20 fitting threaded stud end 9 in such manner that the tool holder is supported to rotate freely, though without play, on stud 8.

A dust cap 21 fits over a flange 22 on tool holder 12.

The amount of motion of tool holder 12 is quite limited for a stud 11 on tool holder 12 enters the slot 10 on this stud piece allowing only the limited motion due to the difference of the diameter of stud 11 and slot 10.

The stud 11 may be rigidly mounted in tool holder 12 or it may have a head eccentric in shank 70 which may be capable of angular adjustment. Thus the shank 70 may have a threaded end on which a conical nut 71 is mounted. This nut is not drawn up tight and is pressed at 73 to the shank 70. Thus the pieces 11, 70, 71, 73 form an assemblage that can be angularly adjusted by screw driver engaging slot 72. In order to lock this assemblage after adjustment a set screw 74 is mounted in the tool holder in such manner that it will bear against shank 70 preventing its rotation.

The conical nut 71 may be graduated so that one division will represent a change in bore diameter of one thousandth of an inch. The adjustment is a sensitive one; a quarter turn of the shank 71 may mean a change in the diameter of the bore of one one-thousandth of an inch.

As the spring 31 presses pin 30 against the stud 11, the normal position of the tool holder will be that shown in Figure 2 where 11 bears against the side of the slot 10 furthest away from pin 30 and if moved from this position, in the absence of other forces, spring 31 will carry the tool holder to the position shown in Figure 2.

A tool bit 14 is mounted in tool holder 12 in any desired manner such as in a bore 15 held by one or more set screws 16 in one or more planes. To facilitate the setting of the tool the end of the bore 15 may be closed by a plug 18 having a threaded portion which extends into axial hole 19, of the tool. A locking ram 23 fits this bore.

After the tool has been moved axially to the proper cutting radius set screw 16 is tightened.

As will best appear from Figure 2, once the tool is set the distance from the cutting edge 40 of tool 14 to 42, the center of stud 8 is a constant while the radius of the hole bored depends on the distance from the tool cutting edge 40 to the boring mill spindle axis 41. As the tool holder pivots about axis 42 the distance 40—41 will vary, being shortest when tool edge 40 is closest to the diameter 41—42 and largest when the tool holder 12 swings as far from the diameter 41—42 as the stud 11 in slot 10 permits. It will be noted that the spring 31 tends to hold the tool in the contracted position shown in full lines in Figure 2, and the resistance of the cut taken by cutter 14 brings the cutter into the dotted position 43 shown in Figure 2.

The operation of the tool will be readily understood by one skilled in the art. Referring more especially to Figure 1 and 2 the rough bore 60 generally has a countersink 61. As the tool in Figure 1 revolving in the spindle is carried vertically into rough bore 60 the cutter 14, is in contracted position 40. When it engages the countersink 61 the resistance of the cut overcomes spring 31 and carries the cutter 14 to position 43 where it is further from spindle axis 41. It now turns a bore 63—63. When the tool has reached the bottom of the bore and the pressure of the work against the tool point 43 ceases the spring 31 brings tool holder 12 back to the contracted position shown at 40. The cutter now generates a bore 62—62. As this is a smaller bore than 63—63, the tool will not mar the work on withdrawing. If the bore is to be increased or decreased the tool 14 is moved lengthwise by micrometer screw on plug 18 after loosening set screw 16.

It will be evident that the position of eccentric stud 11 on tool holder 12 determines how far the tool can swing out when in position 43. Accordingly for a precise adjustment of the bore diameter, or means for correction for tool wear, this offers great convenience and accuracy. As the tool bit is not unclamped there is no loss of position due to drawing up locking drivers or set screws.

Having described the invention, what is claimed and desired to be secured by Letters Patent is:

I claim:

1. A revolving boring tool head comprising in combination, an axially revolving body having a transverse bearing surface and a stud parallel to and located to one side of the axis, a disc-shaped tool holder pivoted on the stud and bearing against the transverse surface, a cutting tool edge and a motion-limiting pin carried by the disc on the opposite side of the axis, the cutting tool edge carried by a tool in a bore along a chord of the disc, its position adjustable from the rear end of the bore; the motion limiting pin extending through the disc and carrying an eccentric head on the bearing side which enters a recess in the body, a spring within the body parallel to the transverse plane tending to move the eccentric head in one direction against the side of the recess, and adjusting means on the end of the pin for moving its axis away from the stop by rotating the eccentric head on the other end of the pin.

2. A tool holder consisting of a cylindrical disc adapted to be supported on a stud that passes to one side of its axis, a bearing surface on one side of the disc, a tool bore along a chord that passes the stud bore and places the cutting end of the tool on the opposite end of the diameter containing the stud bore, means for moving the tool longitudinally in its bore for adjustment and means for locking it in position after adjustment, a circular pin passing through the tool holder proximate to the cutting edge of the tool, an eccentric head on the pin beyond the bearing surface, micrometer adjusting means for the circular pin and radial locking means for the circular pin, the tool holder coacting with the supporting body in a manner that the work will draw the cutting edge away from the diameter passing through stud and spindle axis to a point determined by the micrometer adjustment and upon completion of the cut the limiting pin determines the swing of the tool back toward the diameter.

3. A revolving boring tool head comprising in combination an axially revolving body having a transverse bearing surface, a stud extending outwardly from said bearing surface on one side of the axis, a disc shaped tool holder pivoted on the stud and bearing against the transverse surface, said tool holder having a bore extending along a cord thereof adapted to receive a cutting tool, means adapted to retain said tool in position including means to adjust its position lengthwise of said bore, a motion limiting pin extending through said revolving body and said tool holder on the opposite side of the axis from said stud, said pin being journaled in one of said members and having an eccentric operating within a recess in the other of said members, and spring means for urging said eccentric to one side of said recess, the parts being constructed and arranged so that when a cutting tool is in said longitudinal bore and when the device is in operation in boring a hole, the engagement of the cutting edge with the work will swing said tool holder about said stud against the motion of said spring and in a direction to cause the cutting edge to take a bite into the metal.

4. A block adapted to be rigidly attached to the outer end of a shaft and concentric therewith, having an outer face forming a transverse bearing surface, a stud carried by said block and extending outwardly from said surface eccentric to the axis, a second block forming a tool holder having an eccentrically disposed bearing to receive said stud, means connecting said block to said tool holder on the opposite side of the axis to position said block upon said stud, and means upon said tool holder for supporting a cutting tool with its cutting edge in the rear of the line connecting the axis of rotation with the center of the stud, said parts being constructed and arranged so that when a cutting tool is supported in said tool holder supporting means and the device is in operation in boring a hole, and spring means for urging said first connecting means to one side, the engagement of the cutting edge with the work will swing said tool holder about said stud against the motion of said spring and in a direction to cause the cutting edge to take a bite into the metal.

5. A device in accordance with claim 4 having means to adjust said positioning means to adjust the position of the cutting edge relative to the axis.

6. A block adapted to be rigidly attached to the outer end of a shaft and concentric therewith, having an outer face forming a transverse bearing surface, a stud carried by said block and extending outwardly from said surface eccentric to the axis, a second block forming a tool holder having an eccentrically disposed bearing to receive said stud, means connecting said block to said tool holder on the opposite side of the axis to position said block upon said stud, said means being constructed and arranged to provide a lost motion about said stud and means upon said tool holder for supporting a cutting tool with its cutting edge in the rear of the line connecting the axis of rotation with the center of the stud and resilient means for taking up said lost motion to urge the cutting tool closer to alignment with the line connecting the axis of rotation with the center of the stud, said parts being constructed and arranged so that when a cutting tool is supported in said tool holder supporting means and the device is in operation in boring a hole, the engagement of the cutting edge with the work will swing said tool holder about said stud against the motion of said resilient means and in a direction to cause the cutting edge to take a bite into the metal.

DANIEL C. EIPPER.